US009367161B2

(12) United States Patent
Havilio

(10) Patent No.: US 9,367,161 B2
(45) Date of Patent: Jun. 14, 2016

(54) TOUCH SENSITIVE DEVICE WITH STYLUS-BASED GRAB AND PASTE FUNCTIONALITY

(71) Applicant: Barnes & Noble College Booksellers, LLC, Basking Ridge, NJ (US)

(72) Inventor: Amir Mesguich Havilio, Palo Alto, CA (US)

(73) Assignee: Barnes & Noble College Booksellers, LLC, Basking Ridge, NJ (US)

( * ) Notice: Subject to any disclaimer, the term of this patent is extended or adjusted under 35 U.S.C. 154(b) by 345 days.

(21) Appl. No.: 13/793,499

(22) Filed: Mar. 11, 2013

(65) Prior Publication Data
US 2014/0253470 A1 Sep. 11, 2014

(51) Int. Cl.
*G06F 3/041* (2006.01)
*G06F 3/0488* (2013.01)
*G06F 3/0354* (2013.01)

(52) U.S. Cl.
CPC .......... *G06F 3/0412* (2013.01); *G06F 3/03545* (2013.01); *G06F 3/0488* (2013.01)

(58) Field of Classification Search
CPC .. G06F 3/03545; G06F 3/0412; G06F 3/0488
See application file for complete search history.

(56) References Cited

U.S. PATENT DOCUMENTS

| 4,896,543 | A | 1/1990 | Gullman |
| 5,633,471 | A | 5/1997 | Fukushima |
| 5,844,557 | A | 12/1998 | Shively, II |
| 6,259,438 | B1 | 7/2001 | Fleck et al. |
| 6,956,564 | B1 | 10/2005 | Williams |
| 7,609,863 | B2 * | 10/2009 | Black ............................ 382/124 |
| 7,649,524 | B2 | 1/2010 | Haim et al. |
| 7,840,912 | B2 | 11/2010 | Elias et al. |
| 7,898,541 | B2 | 3/2011 | Hong et al. |
| RE42,738 | E | 9/2011 | Williams |
| 8,059,101 | B2 | 11/2011 | Westerman et al. |

(Continued)

FOREIGN PATENT DOCUMENTS

EP 0722150 A1 7/1996

OTHER PUBLICATIONS

"Adonit Jot Touch (for iPad)," Adonit Jot Touch (for iPad) Review & Rating—PCMag.com; http://www.pcmag.com/article2/0,2817,2411192,00.asp; 6pages, printed from the Internet on Jun. 20, 2013.

(Continued)

*Primary Examiner* — Abbas Abdulselam
(74) *Attorney, Agent, or Firm* — Finch & Maloney PLLC

(57) ABSTRACT

Techniques are disclosed for grabbing and pasting content using a stylus in communication with an electronic device. The grab function can be used to copy/cut content from the device to stylus memory. The paste function can be used to delete content from the stylus memory, or paste that content to the same or different device. The user can grab content to the stylus with a stylus action, which may include manipulating a stylus control feature or performing a particular stylus gesture. The content may then be deleted from the stylus memory or pasted to a device by performing another stylus action, which may be the same or distinct from the grab stylus action. Pasting the content from the stylus memory to an electronic device may also include removing the content from the stylus memory. An animation can be displayed as content is sucked into stylus, or pasted to new locations.

22 Claims, 8 Drawing Sheets

(56) References Cited

U.S. PATENT DOCUMENTS

| | | | |
|---|---|---|---|
| 8,239,413 | B2 | 8/2012 | Hubert |
| 8,274,536 | B2 | 9/2012 | Chaudhri et al. |
| 8,286,104 | B1 | 10/2012 | Yonge-Mallo |
| D670,713 | S | 11/2012 | Cranfill et al. |
| RE44,103 | E | 3/2013 | Williams |
| 8,400,417 | B2 | 3/2013 | Ording et al. |
| 8,508,494 | B2 | 8/2013 | Moore |
| 2001/0025289 | A1 | 9/2001 | Jenkins et al. |
| 2002/0116421 | A1 | 8/2002 | Fox et al. |
| 2007/0047002 | A1 | 3/2007 | Hull et al. |
| 2008/0036747 | A1 | 2/2008 | Hope |
| 2008/0198146 | A1* | 8/2008 | Bryborn ............... G06F 3/0317 345/179 |
| 2010/0100854 | A1 | 4/2010 | Russell et al. |
| 2010/0192086 | A1 | 7/2010 | Kocienda et al. |
| 2010/0229130 | A1 | 9/2010 | Edge et al. |
| 2010/0259482 | A1 | 10/2010 | Ball |
| 2010/0262659 | A1 | 10/2010 | Christiansen et al. |
| 2010/0318895 | A1 | 12/2010 | Steinberger et al. |
| 2011/0258542 | A1 | 10/2011 | Kenney et al. |
| 2012/0056821 | A1 | 3/2012 | Goh |
| 2012/0127110 | A1 | 5/2012 | Amm et al. |
| 2012/0139879 | A1 | 6/2012 | Kim et al. |
| 2012/0221938 | A1 | 8/2012 | Patterson et al. |
| 2012/0235901 | A1 | 9/2012 | Binder |
| 2012/0242579 | A1 | 9/2012 | Chua |
| 2012/0242584 | A1 | 9/2012 | Tuli |
| 2012/0249768 | A1 | 10/2012 | Binder |
| 2012/0280947 | A1 | 11/2012 | Weaver et al. |
| 2012/0311438 | A1 | 12/2012 | Cranfill et al. |
| 2012/0329529 | A1 | 12/2012 | Van Der Raadt |
| 2013/0016045 | A1 | 1/2013 | Zhao et al. |
| 2013/0036383 | A1 | 2/2013 | Yuan et al. |
| 2013/0063364 | A1 | 3/2013 | Moore |
| 2013/0076632 | A1 | 3/2013 | Sirpal et al. |
| 2013/0076637 | A1 | 3/2013 | Teltz |
| 2013/0076638 | A1 | 3/2013 | Sirpal et al. |
| 2013/0076781 | A1 | 3/2013 | Sirpal et al. |
| 2013/0113699 | A1 | 5/2013 | Lim |
| 2013/0120271 | A1 | 5/2013 | Lee et al. |
| 2013/0135234 | A1 | 5/2013 | Hisano et al. |
| 2013/0139078 | A1 | 5/2013 | Chuang et al. |
| 2013/0139107 | A1 | 5/2013 | Jung |
| 2013/0162532 | A1 | 6/2013 | Cheng et al. |
| 2013/0185680 | A1 | 7/2013 | Chaudhri et al. |
| 2013/0194308 | A1 | 8/2013 | Privault et al. |

OTHER PUBLICATIONS

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are chock-full-of-cool-ideas.html, originally published Feb. 28, 2013, 13 pages, printed from the Internet on Aug. 13, 2013.

"Bamboo Stylus," Wacom Americas, http://lwww.wacom.com/enlproductslstylus, 5 pages, printed from the Internet on Jun. 20, 2013.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.

Malacria, et al., "Clutch-Free Panning and Integrated Pan-Zoom Control on Touch-Sensitive Surfaces: the CycloStar Approach," CHI 2010, Apr. 10-15, 2010, Atlanta, Georgia, USA. Copyright 2010 ACM 978-1-60558-929-9, 10 pages, Sep. 10, 2004.

"Pen," DuoSense Pen, N-trig Hands-on computing, http://www.n.-trig.com/Content.aspx?Page=DigitalPencil, 3 pages, printed from the Internet on Jun. 20, 2013.

"Easing functions," Easing Functions Cheat Sheet, http://easings.net/, 3 pages, printed from the Internet on Jun. 17, 2013.

Kirupa, Easing Functions (aka Timing Functions) in CSS3, printed Apr. 3, 2013, Kirupa.com, http://www.kirupa.com/htm15/easing_functions_css3.htm, 16 pages, printed from the Internet on Jun. 18, 2013.

"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.

"Explaining how the sPen tech works (and is very diff than other styluses)," http://forum.xda-developers.com/showthread.php?t=, 1 page, printed from the Internet on Jan. 15, 2013.

"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.

"Guidelines for selecting text and images (Windows Store apps)," http://msdn.microsoft.com/en-us/library/windows/apps/hh465334, 5 pages, printed from the Internet on Jun. 20, 2013.

Lutz, Zachary, "Hands-on with wireless, ultrasonic stylus an touchless gestures at MWC (video)," posted Mar 1st, 2012 at 8:28 AM, http://www.engadget.com/2012/03/01/hands-on-with-wireless-ultrasonic-stylus-and-touchl, 3 pages, printed from the Internet on Jun. 20, 2013.

"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.

"How do WACOM tablets work?," tablet4u.co.uk, http://www.tablet4u.co.uk/techinfo.html, 2 pages, printed from the Internet on Jun. 20, 2013.

Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown-6 pages, printed from the Internet on Nov. 3, 2012.

"Desktop Touchscreens,"—Desktop touchscreens explained, http://www.touchscreenmagazine.nl/touchscreen-solutions/desktop-touchscreens, 1 page, printed from the Internet on Nov. 3, 2012.

"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.

"Padblue 2," Brando—mobile.brando.com, http://mobile.brando.com/Padblue-2_p9162c1577d94.html., 4 pages, printed from the Internet on May 10, 2013.

Fingas, Jon, "Panasonic mobile devices to use Anoto's pattern-based pen input technology," posted Jan. 8th, 2013 at 1:00PM, http://www.engadget.com/2013/01/08/panasonic-mobile-devices-to-use-anoto-pattern-pen-, 4 pages, printed from the Internet on Jun. 20, 2013.

"Bluetooth 4.0 SmartPen the future just got a little brighter," Pogo Connect, http://tenonedesign.com/connect.php, 7 pages, printed from the Internet on Jun. 20, 2013.

Quick, Darren, "Pressure sensitive technology set to bring 3D capability to touchscreens," posted on Jan. 31, 2010, Mobile Technology, http://www.gizmag.cominew-touchscreen-technology, 4 pages, printed from the Internet on Aug. 2, 2013.

Rigg, Jamie, "Sony tries to patent stylus with friction-based haptic feedback," posted on Nov 22nd, 2012 at 9:50 AM, http://www.engadget.com/2012/11/22/sony-haptic-feedback-stylus-patent/, 2 pages, printed from the Internet on Jun. 20, 2013.

"Stylus Hanging Bluetooth Headset," BRANDO—mobile.brando.com, http://mobile.brando.com/prod_detail.php? prod_id=03291, 4 pages, printed from the Internet on May 10, 2013.

"The JukeStyle is a great budget stylus for your iOS devices," stylus Archives—iPad News, http://www.ipadnews.nl/tag/stylus/, 44 pages, printed from the Internet on Jun. 20, 2013.

Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flip-

(56) References Cited

OTHER PUBLICATIONS ping-through-paper-like-pages-endures-in-the-digital-world/, 5 pages, printed from the Internet on May 6, 2013.
Bragdon, et al., "Experimental Analysis of Touch-Screen Gesture Designs in Mobile Environments", Proceedings of the SIGCHI Conference on Human Factors in Computing Systems, pp. 403-412 (2011).
"Gesture Search for Google Mobile", Google Mobile, www.google.com/mobile/gesture-search, 1 page, printed from the Internet on Dec. 26, 2012.
"Comics by comiXology," Comic Book Reader Guide, http://www.comicbookreaderguide.com/comics-by-comixology/, 24 pages, printed from the Internet on May 6, 2013.
"NFC Forum: Frequently Asked Questions," http://www.nfc-forum.org/resources/faqs#acknowledge, 11 pages, printed from the Internet on Feb. 18, 2013.
"How to Remote Wipe an iPhone or iPad," OSXDaily, http://osxdaily.com/2012/06/05/remote-wipe-iphone-or-ipad/, 4 pages, printed from the Internet on Feb. 2, 2013.
"Screen hotspot," Wikipedia, the free encyclopedia, http://en.wikipedia.org/wiki/Screen_hotspot, 1 page, printed from the Internet on May 15, 2013.
"PAiA-Touch Switches," PAiA Corporation USA, file:///S:/Client%20Files/Barnes%20&%20Noble/IDS%20Master%20Folder/S&G%20-%2 . . . , 3 pages, printed from the Internet on Aug. 27, 2013.
Kanai, et al., "Intra-Rendition Navigation," Copyright 2012-2013 International Digital Publishing Forum (IDPF), 13 pages.
"Simultaneous Pen & Touch: The Natural Way to Work," Perceptive Pixel Active Stylus, www.perceptivepixel.com/_literature__136086/Active_Stylus, 2 pages, printed from the Internet on Dec. 14, 2012.

* cited by examiner

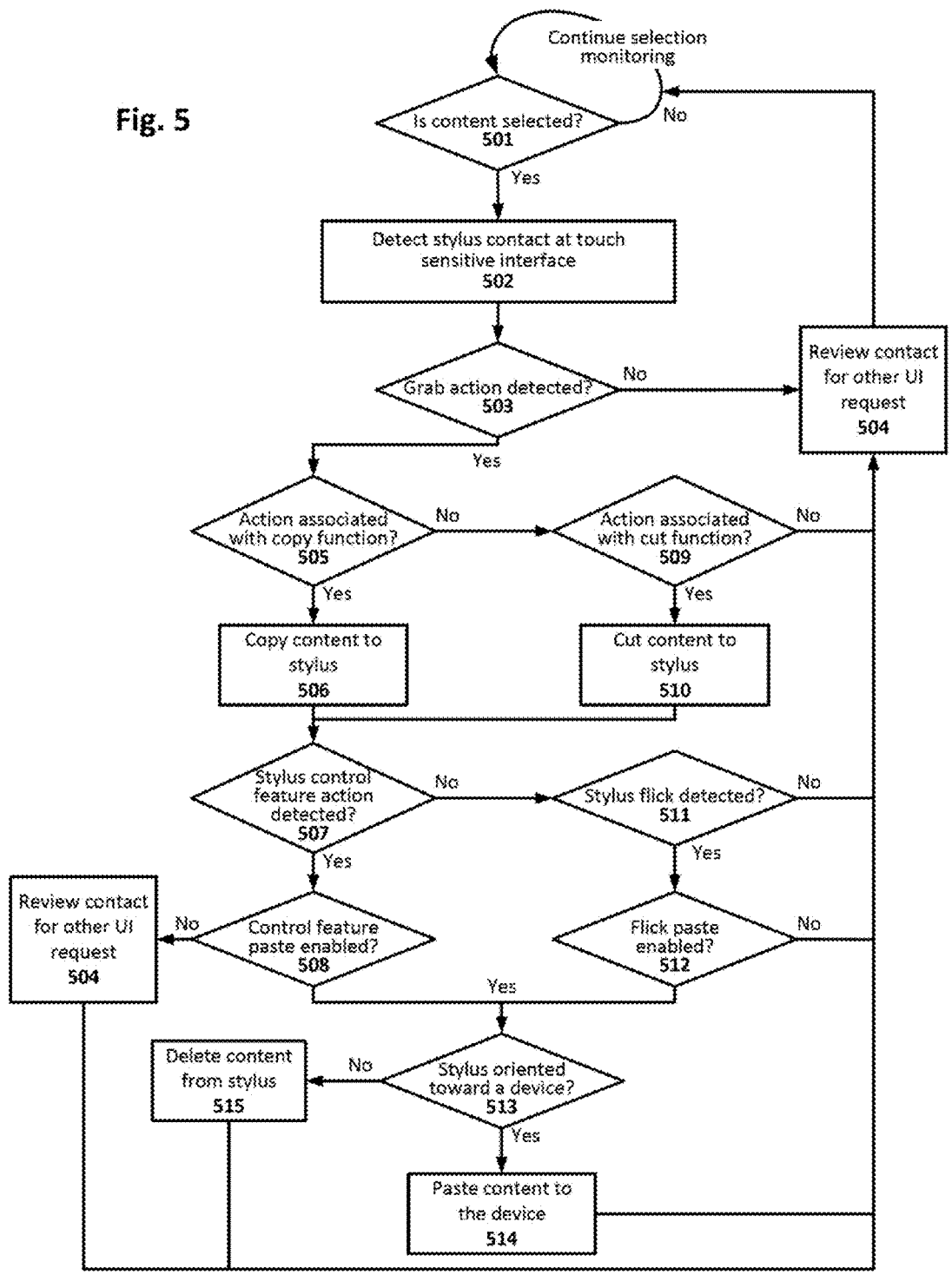

TOUCH SENSITIVE DEVICE WITH STYLUS-BASED GRAB AND PASTE FUNCTIONALITY

FIELD OF THE DISCLOSURE

This disclosure relates to electronic display devices, and more particularly, to user interface techniques for interacting with touch sensitive devices.

BACKGROUND

Electronic display devices such as tablets, eReaders, mobile phones, smart phones, personal digital assistants (PDAs), and other such touch screen electronic display devices are commonly used for displaying consumable content. The content may be, for example, an eBook, an online article or blog, images, documents, a movie or video, just to name a few types. Such display devices are also useful for displaying a user interface that allows a user to interact with the displayed content. The user interface may include, for example, one or more touch screen controls and/or one or more displayed labels that correspond to nearby hardware buttons. The user may interact with the touch sensitive device using fingers, a stylus, or other user implement. The touch screen display may be backlit or not, and may be implemented for instance with an LED screen or an electrophoretic display. Such devices may also include other touch sensitive surfaces, such as a track pad (e.g. capacitive or resistive touch sensor) or touch sensitive housing (e.g., acoustic sensor).

BRIEF DESCRIPTION OF THE DRAWINGS

FIG. 3c' illustrates an example delete function of a stylus and an electronic touch sensitive device, in accordance with an embodiment of the present invention.

FIG. 3c" illustrates an example paste function of a stylus and an electronic touch sensitive device, in accordance with another embodiment of the present invention.

FIG. 5 illustrates a method for copying/cutting content from an electronic touch sensitive device onto a stylus and pasting or deleting that content from the stylus, in accordance with an embodiment of the present invention.

DETAILED DESCRIPTION

Figure 1A:
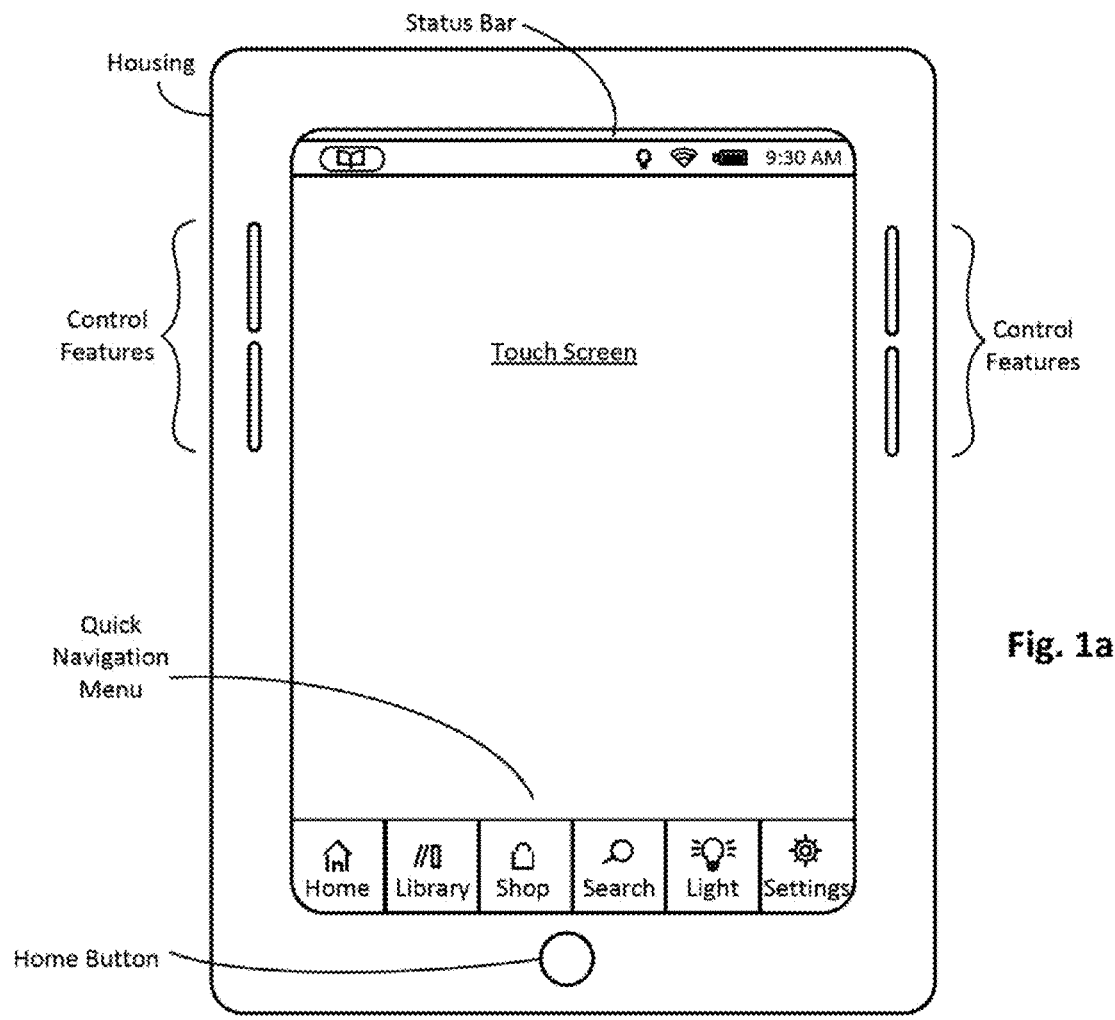
FIGS. 1a-b illustrate an example electronic touch sensitive device having a stylus-based grab and paste function, in accordance with an embodiment of the present invention.

Techniques are disclosed for grabbing and pasting content using a stylus in communication with an electronic touch sensitive device. The grab function can be used to copy or cut content from an electronic device to memory of the stylus. The paste function can be used to delete the grabbed content from the stylus memory, or to paste the grabbed content to the same or a different electronic device. The user can grab the content to the stylus with a particular stylus action, which may include manipulating a stylus control feature or performing a particular stylus gesture. The grabbed content may then be deleted from the stylus memory or pasted to an electronic device by performing another stylus action, which may be the same or distinct from the grab stylus action. In some cases, pasting the content from the stylus memory to an electronic device also includes removing the content from the stylus memory. The touch sensitive device can control the grab and paste actions through a communication link with the stylus. In some cases, the stylus may have a processor or some degree of intelligence if so desired. An appropriate animation can be displayed as content is effectively sucked into the stylus, or pasted to a new location.

General Overview

As previously explained, electronic display devices such as tablets, eReaders, and smart phones are commonly used for displaying user interfaces and consumable content. In some instances, the user might desire to copy, paste, delete, or otherwise relocate content on a given electronic device. For instance, the user might wish to organize certain files by sending them to a particular folder, sending them to another electronic device, or deleting them. While most electronic devices typically provide a series of actions for saving/deleting/relocating content, there does not appear to be an intuitive stylus-based user interface function for relocating content.

Thus, and in accordance with an embodiment of the present invention, stylus-based techniques are provided for copying, cutting, pasting, and deleting data in electronic touch sensitive devices. The techniques disclosed may be used to relocate or copy data to another location within an electronic device, to relocate or copy data from one electronic device to another, or to delete data from an electronic device. In some such embodiments, cut and copy actions (generally referred to as 'grab' actions herein) cause the target data to be copied to a memory in the stylus, and paste and delete actions cause the target data to be purged from the stylus memory. The user can grab data with a particular stylus action, such as clicking a button on the stylus, or a stylus gesture that is associated with the grab function such as sweeping motion away from the device or a particular gesture on the touch sensitive surface. In a more general sense, any uniquely identifiable stylus action or stylus contact on a touch sensitive surface by the user can be configured to engage the grab function. As used herein, the grab function may refer, for example, to any technique involving saving data from the electronic device onto the stylus memory, which may or may not include copying or cutting data. Once the target content is loaded into the stylus memory, the user may perform a particular stylus action to paste that content to a different location within the electronic device, or onto another electronic device which can communicatively couple with the stylus. Note that the paste function may also include deleting content from the stylus. For instance, stylus content may be deleted when a paste function is performed when the stylus is not oriented toward any electronic device that can receive the content. In other embodiments, the user may assign a specific stylus control feature to the delete function in order to clear the stylus memory. In some example embodiments, a delete action may be reversible (e.g., such as the example case where deleted content is sent to a digital trash can, but is still restorable therefrom); other embodiments may provide for a permanent delete, if so desired.

In some embodiments, the grab function may be combined with or otherwise preceded by a content selection gesture (e.g., a single tap selection, a tap-and-drag selection, bookend taps where content between two taps is selected, or any other available content selection technique). As will be appreciated, the stylus may be used to make the content selection, but it need not be; rather, content selected by any means can be saved to the stylus. In one example embodiment, the user may select one or more files or folders with the stylus, and then perform the grab action, which will save those selected files or folders onto the stylus. In another such embodiment, the user may select a portion of content within a given file (e.g. word, paragraph, chapter, portion of audio or video, etc) with the stylus, and then perform the grab action, which will save that selected content portion onto the stylus. In a more general sense, the stylus may be used grab target content that was pre-selected with or without the stylus, or to simultaneously select and grab target content. The degree to which the selection and grab processes overlap may vary depending on factors such as the type of content being grabbed and the processing capability of the device.

In other embodiments, no content selection is required. For instance, in some such cases, the grab function will copy all content currently on display as well as any buffered content available for display. In other cases, the selection-free grab function will grab a pre-established block of content in accordance with a given structure associated with that content. For example, assume an eBook that is broken into chapters is currently on display, and opened to a particular chapter. A selection-free grab function will automatically copy that entire chapter into the stylus, in accordance with some embodiments. Variations will be apparent, such as grabbing an entire section that is currently on display and part of a chapter, or grabbing the entire book, or grabbing the currently displayed paragraph(s) or page. The coarseness of such selection-free grabs can be hard-coded or user-configurable, if so desired. Another example is an album of music or pictures that is open on the display. In such a case, a selection-free grab function can automatically grab all files within that album. Likewise, if a photo or video is currently active on the display, a grab function can automatically grab that entire file. Numerous such selection-free grabs will be apparent in light of this disclosure.

In some example embodiments, the grab and paste functions are accompanied with animation and/or sound effects to further enhance the user interface experience. For example, example grab animation might show a vortex or sucking of the selected content into pen. In a similar fashion, a paste animation might show a throwing or spraying of the stylus content onto the target device. If a delete or purge stylus action is being executed (where there is no target device), then a sound could be played, such as a flushing or gurgling drain sound, or a downward whistling sound, or a custom sound selected by the user, or any other suitable sound. A combination of animation and sound can be used as well, as will be appreciated. Thus, in one example case, the user can press-and-hold a top or side stylus button to grab (copy/cut) content, wherein the user can hold the button until the grab animation is near over or a notification indicates a near completed status. The user can then flick the stylus down towards same device or some other compatible device, or click-and-release stylus button again, to cause the paste animation and paste that grabbed content. A flick or button click-and-release away from any device can cause a delete sound (a purge animation on the device from which the content is being deleted may be shown, if so desired).

Numerous uniquely identifiable engagement and notification schemes that exploit a stylus and a touch sensitive surface can be used as will be appreciated in light of this disclosure. Further note that any touch sensitive device (e.g., track pad, touch screen, or other touch sensitive surface, whether capacitive, resistive, acoustic or other touch detecting technology) may be used to detect the user contact and the claimed invention is not intended to be limited to any particular type of touch sensitive technology, unless expressly stated.

Architecture

Figure 1B:
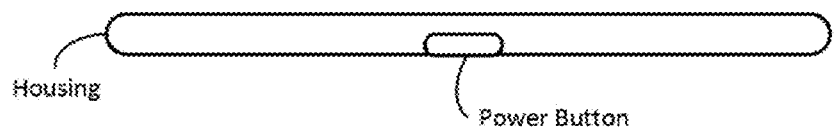

FIGS. 1a-b illustrate an example electronic touch sensitive device having a stylus-based grab and paste function, in accordance with an embodiment of the present invention. The device could be, for example, a tablet such as the NOOK® tablet or eReader by Barnes & Noble. In a more general sense, the device may be any electronic device having a touch sensitive user interface and capability for displaying content to a user, such as a mobile phone or mobile computing device such as a laptop, a desktop computing system, a television, a smart display screen, or any other device having a touch screen display or a non-touch display screen that can be used in conjunction with a touch sensitive surface. As will be appreciated in light of this disclosure, the claimed invention is not intended to be limited to any particular kind or type of electronic device.

As can be seen with this example configuration, the device comprises a housing that includes a number of hardware features such as a power button, control features, and a press-button (sometimes called a home button herein). A touch screen based user interface is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such user interface (UI) touch screen features, or different UI touch screen features altogether, depending on the target application of the device. Any such general UI controls and features can be implemented using any suitable conventional or custom technology, as will be appreciated.

The hardware control features provided on the device housing in this example embodiment are configured as elongated press-bars and can be used, for example, to page forward (using the top press-bar) or to page backward (using the bottom press-bar), such as might be useful in an eReader application. The power button can be used to turn the device on and off, and may be used in conjunction with a touch-based UI control feature that allows the user to confirm a given power transition action request (e.g., such as a slide bar or tap point graphic to turn power off). Numerous variations will be apparent, and the claimed invention is not intended to be limited to any particular set of hardware buttons or features, or device form factor.

In this example configuration, the home button is a physical press-button that can be used as follows: when the device is awake and in use, tapping the button will display the quick navigation menu, which is a toolbar that provides quick access to various features of the device. The home button may also be configured to cease an active function that is currently executing on the device, or close a configuration sub-menu that is currently open. The button may further control other functionality if, for example, the user presses and holds the home button. For instance, an example such push-and-hold function could engage a power conservation routine where the device is put to sleep or an otherwise lower power consumption mode. So, a user could grab the device by the button, press and keep holding as the device was stowed into a bag or purse. Thus, one physical gesture may safely put the device to sleep. In such an example embodiment, the home button may be associated with and control different and unrelated actions: 1) show the quick navigation menu; 2) exit a configuration sub-menu; and 3) put the device to sleep. As can be further seen, the status bar may also include a book icon (upper left corner). In some cases, tapping the book icon may provide bibliographic information on the content or provide the main menu or table of contents for the book, movie, playlist, or other content.

Figure 1C:
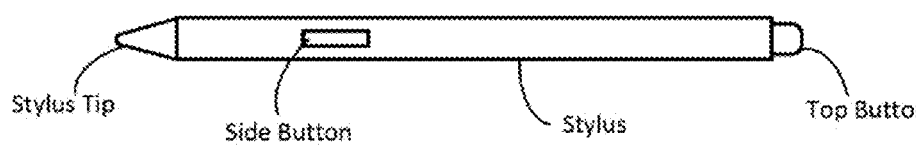
FIG. 1c illustrates an example stylus for use with an electronic touch sensitive device, configured in accordance with an embodiment of the present invention.

FIG. 1c illustrates an example stylus for use with an electronic touch sensitive device configured in accordance with an embodiment of the present invention. As can be seen, in this particular configuration, the stylus comprises a stylus tip used to contact the touch sensitive surface (direct contact or proximate contact), and control features including a top button and a side button along the shaft of the stylus. In this example, the stylus tip has a rounded triangular shape, while in alternative embodiments the stylus tip may be more rounded, or any other suitable shape. The stylus tip may be made of any number of materials of different textures and firmness depending on the needs of the specific touch sensitive device. The stylus may include fewer or additional control features than the top and side buttons illustrated in FIG. 1c, or different control features altogether. Such control features may include, for example, a rotating knob, a switch, a sliding control bar, or other suitable control feature that will be apparent in light of this disclosure. The principles disclosed herein equally apply to such control features. For ease of description, stylus examples are provided with push button control features. The stylus may be a resistive or capacitive stylus, an active stylus, or any other suitable implement for interacting with the touch sensitive surface. As will be appreciated, the claimed invention is not intended to be limited to any particular kind or type of stylus. In one example embodiment, the grab and paste function described herein may be performed by manipulating the stylus control features, or with stylus gestures and motions that are detected by the touch sensitive area of the electronic device.

Figure 1D:
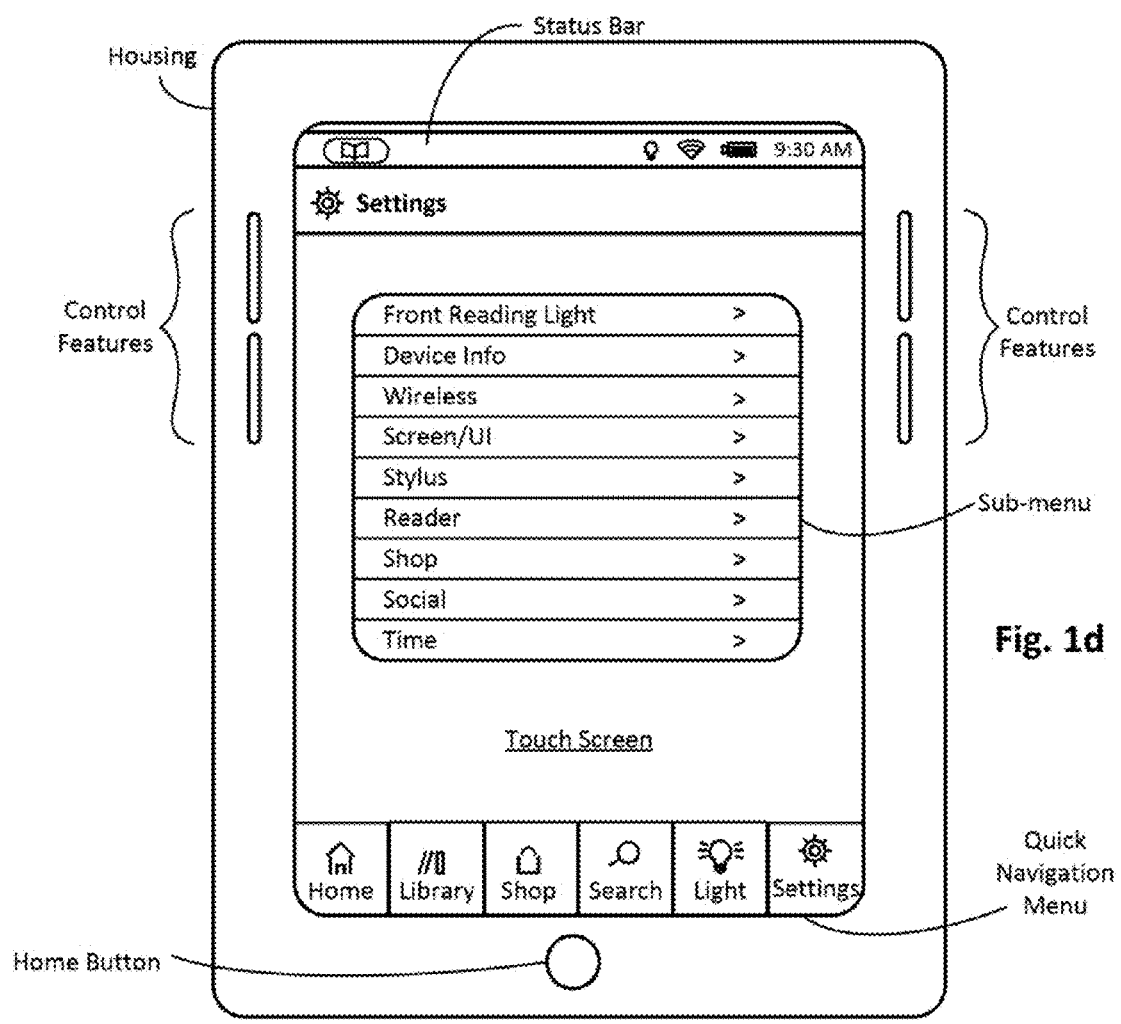
FIGS. 1d-e illustrate example configuration screen shots of the user interface of the electronic touch sensitive device shown in FIGS. 1a-b, configured in accordance with an embodiment of the present invention.
Figure 1E:
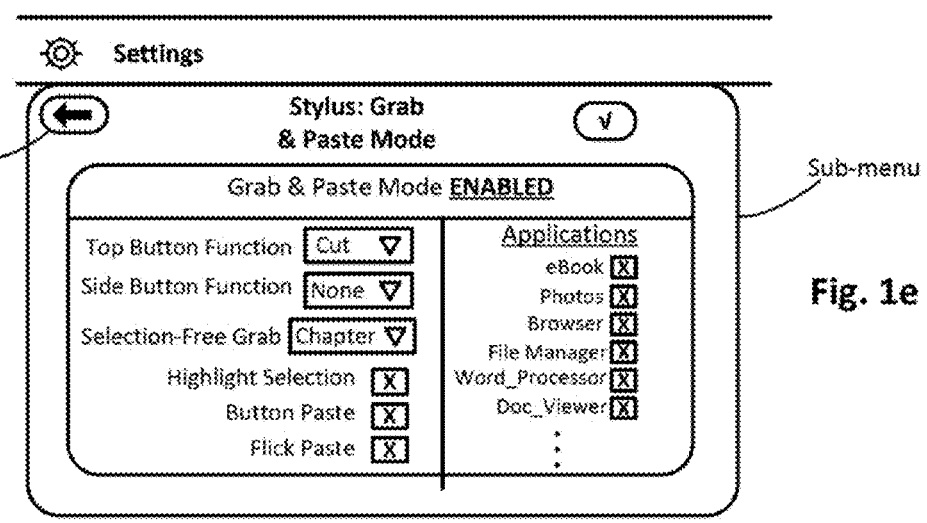

In one particular embodiment a stylus grab and paste configuration sub-menu, such as the one shown in FIG. 1e, may be accessed by tapping or otherwise selecting the Settings option in the quick navigation menu, which causes the device to display the general sub-menu shown in FIG. 1d. From this general sub-menu, the user can select any one of a number of options, including one designated Stylus in this specific example case. Selecting this sub-menu item (with an appropriately placed screen tap) may cause the configuration sub-menu of FIG. 1e to be displayed, in accordance with an embodiment. In other example embodiments, selecting the Stylus option may present the user with a number of additional sub-options, one of which may include a so-called stylus grab and paste feature option, which may then be selected by the user so as to cause the stylus grab and paste configuration sub-menu of FIG. 1e to be displayed. Any number of such menu schemes and nested hierarchies can be used, as will be appreciated in light of this disclosure. In other embodiments, the stylus grab and paste function is hard-coded such that no configuration sub-menus are needed or otherwise provided (e.g. top button click for carrying out actions as described herein, with no user configuration). The degree of hard-coding versus user-configurability can vary from one embodiment to the next, and the claimed invention is not intended to be limited to any particular configuration scheme of any kind, as will be appreciated.

As will be appreciated, the various UI control features and sub-menus displayed to the user are implemented as UI touch screen controls in this example embodiment. Such UI touch screen controls can be programmed or otherwise configured using any number of conventional or custom technologies. In general, the touch screen translates the user touch in a given location into an electrical signal which is then received and processed by the underlying operating system (OS) and circuitry (processor, etc). The user touch may be performed with a finger, a stylus, or any other suitable implement, unless otherwise specified. Additional example details of the underlying OS and circuitry in accordance with some embodiments will be discussed in turn with reference to FIG. 2a.

As previously explained, and with further reference to FIGS. 1d and 1e, once the Settings sub-menu is displayed (FIG. 1d), the user can then select the Stylus option. In response to such a selection, the stylus grab and paste configuration sub-menu shown in FIG. 1e can be provided to the user. The user can configure a number of functions with respect to the stylus grab and paste mode, in this example embodiment. For instance, in this example case, the configuration sub-menu includes a UI check box that when checked or otherwise selected by the user, effectively enables the stylus grab and paste/delete mode (shown in the enabled state); unchecking the box disables the mode. Other embodiments may have the stylus grab and paste mode always enabled, or enabled by a physical switch or button, for example. In addition, the stylus of this example case includes a top button and a side button, and once the content selection mode is enabled, the user can select a function for each of the buttons from a drop down menu. Examples of possible functions include, cut, copy, delete, or none. In this particular example, the top button is configured to cut selected content from an electronic device and save it to the stylus, while the side button is not associated with any copy or cut function. In another example, the side button could be associated with the copy function, if so desired (to keep copy and cut as separate functions).

As can further be seen with respect to FIG. 1e, the user may specify a type of selection-free grab, as previously explained. In this example case, a book chapter will be automatically copied into the stylus in response to a stylus-based grab action. Other possible choices in the selection-free grab pull-down menu might be, for example, displayed page or paragraphs, chapter section, entire book, entire album, currently active file (e.g., video, audio, picture files). In some embodiments the user may also enable a highlight selection option, which may highlight the selected content when the user begins to engage the grab action. Such a feature can apply when the selection-free grab does not apply. Priority to one or the other may be set as desired. In this particular embodiment shown in FIG. 1e, the highlight mode is enabled and the selected text is highlighted once the top button is pressed. As used here, highlighting may refer, for example, to any visual and/or aural indication of a content selection, which may or may not include a formatting change. In some embodiments the user may also enable a button paste function and/or a flick paste function. Enabling these functions allows the user to paste content saved on the stylus memory to a new location on an electronic device, or onto another compatible electronic device by performing the flick gesture or manipulating one or more of the stylus control features.

With further reference to the example embodiment of FIG. 1e, the user may also specify a number of applications in which the stylus grab and paste mode can be invoked. Such a configuration feature may be helpful, for instance, in a tablet or laptop or other multifunction computing device that can execute different applications (as opposed to a device that is more or less dedicated to a particular application). In this example case, the available applications are provided along with a corresponding check box, but could be pull-down menus or some other suitable UI feature. Note the diverse nature of the example applications, including an eBook application, a photo viewing application, a browser application, a file manager application, a word processor application, a document viewer application, which are just a few examples. In other embodiments, the grab and paste mode can be invoked whenever the stylus is activated, regardless of the application being used. Any number of applications or device functions may benefit from a stylus-based grab and paste mode as provided herein, whether user-configurable or not, and the claimed invention is not intended to be limited to any particular application or set of applications.

As can be further seen, a back button arrow UI control feature may be provisioned on the touch screen for any of the menus provided, so that the user can go back to the previous menu, if so desired. Note that configuration settings provided by the user can be saved automatically (e.g. user input is saved as selections are made or otherwise provided). Alternatively, a save button or other such UI feature can be provisioned, which the user can engage as desired. Numerous other configurable aspects will be apparent in light of this disclosure. For instance, in some embodiments, the stylus-based grab and paste function can be assigned on a context basis. For instance, the configuration menu may allow the user to assign the top button to copy entire files or emails and assign the side button to copy within a given file. Thus, the techniques provided herein can be implemented on a global level, a content based level, or an application level, in some example cases.

Figure 2A:
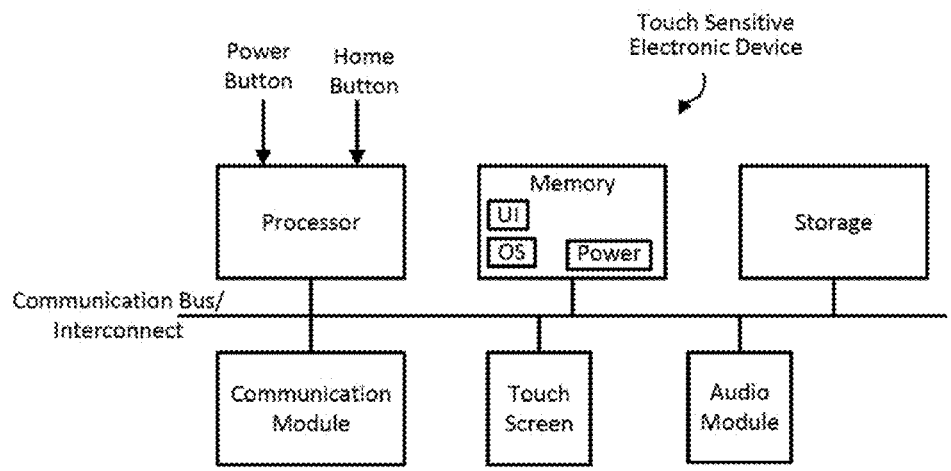
FIG. 2a illustrates a block diagram of an electronic touch sensitive device, configured in accordance with an embodiment of the present invention.

FIG. 2a illustrates a block diagram of an electronic touch screen device configured in accordance with an embodiment of the present invention. As can be seen, this example device includes a processor, memory (e.g., RAM and/or ROM for processor workspace and storage), additional storage/memory (e.g., for content), a communications module, a touch screen, and an audio module. A communications bus and interconnect is also provided to allow inter-device communication. Other typical componentry and functionality not reflected in the block diagram will be apparent (e.g., battery, co-processor, etc). Further note that although a touch screen display is provided, other embodiments may include a non-touch screen and a touch sensitive surface such as a track pad, or a touch sensitive housing configured with one or more acoustic sensors, etc. In any such cases, the touch sensitive surface is generally capable of translating a user's physical contact with the surface into an electronic signal that can be manipulated or otherwise used to trigger a specific user interface action, such as those provided herein. The principles provided herein equally apply to any such touch sensitive devices. For ease of description, examples are provided with touch screen technology.

In this example embodiment, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc), and encoded on a machine readable medium, that when executed by the processor (and/or co-processors), carries out the functionality of the device including a UI having a stylus grab and paste function as described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., 800 MHz Texas Instruments OMAP3621 applications processor), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory).

The display can be implemented, for example, with a 6-inch E-ink Pearl 800×600 pixel screen with Neonode® zForce® touch screen, or any other suitable display and touch screen interface technology. As will be appreciated in light of this disclosure, the display may further include stylus detection technology and can be any display that is configured with stylus detecting technologies, whether capacitive, resistive, acoustic, active-stylus, and/or other input detecting technology. For example, in some embodiments, the screen display can be layered above input sensors, such as a capacitive sensor grid for passive touch-based input, such as with a finger or passive stylus in the case of a so-called in-plane switching (IPS) panel, or an electromagnetic resonance (EMR) sensor grid. In some embodiments, the stylus detection display can be configured with a purely capacitive sensor, while in other embodiments the touch screen display may be configured to provide a hybrid mode that allows for both capacitive input and EMR input, for example. In still other embodiments, the stylus detection surface is configured with only an active stylus sensor. Numerous touch screen display configurations can be implemented using any number of known or proprietary screen based input detecting technologies. In any such embodiments, a stylus detection surface controller may be configured to selectively scan the stylus detection surface and/or selectively report stylus inputs detected directly one or otherwise sufficiently proximate to (e.g., within a few centimeters, or otherwise sufficiently close so as to allow detection) the stylus detection surface (or touch sensitive display, in this example case). In one example embodiment, a stylus input can be provided by the stylus hovering some distance above the stylus detection display (e.g., one to a few centimeters above the surface, or even farther, depending on the sensing technology deployed in the touch sensitive display surface), but nonetheless triggering a response at the device just as if direct contact were provided directly on the display. As will be appreciated in light of this disclosure, a stylus as used herein may be implemented with any number of stylus technologies, such as a DuoSense® pen by N-trig® (e.g., wherein the stylus utilizes a touch sensor grid of a touch screen display) or EMR-based pens by Wacom technology, or any other commercially available or proprietary stylus technology. Further recall that the stylus sensor in the computing device may be distinct from an also provisioned touch sensor grid in the computing device. Having the touch sensor grid separate from the stylus sensor grid allows the device to, for example, only scan for an stylus input, a touch contact, or to scan specific areas for specific input sources, in accordance with some embodiments. In one such embodiment, the stylus sensor grid includes a network of antenna coils that create a magnetic field which powers a resonant circuit within the stylus. Stylus-based control feature actions (such as a button press) cause a change in the resonant frequency of the resonant circuit, and that change in resonant frequency can be detected by the stylus detection technology in the touch sensitive display, thereby indicating the stylus-based control feature action to the device. In such an example, the interaction between the resonant circuit and the detection coils of the touch sensitive surface allow the stylus' location above the device, angle of inclination, speed of movement, and control feature activation (e.g., push-button action) to be tracked or otherwise known by the device. In one particular example, the stylus sensor grid includes more than one set of antenna coils. In such an example embodiment, one set of antenna coils may be used to merely detect the presence of a touching or hovering or otherwise sufficiently proximate stylus, while another set of coils determines with more precision the stylus' location above the device and can track the stylus' movements. Any number of such combinational stylus touch sensitive display arrangements can be used, as will be appreciated in light of this disclosure.

The communications module can be configured to execute, for instance, any suitable protocol which allows for connection to the stylus so that content can be downloaded to the stylus from the device and pasted from the stylus onto the device. Example communications modules may include an NFC (near field connection), Bluetooth, Wi-Fi (e.g., IEEE802.11b/g/n WLAN), or other suitable chip or chip set that allows for wireless connection to the stylus (including any custom or proprietary protocols). In some embodiments, a wired connection can be used between the stylus and device. In some specific example embodiments, the device housing that contains all the various componentry measures about 6.5" high by about 5" wide by about 0.5" thick, and weighs about 6.9 ounces. Any number of suitable form factors can be used, depending on the target application (e.g., laptop, desktop, mobile phone, etc). The device may be smaller, for example, for smartphone and tablet applications and larger for smart computer monitor applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured, for example, to automatically transition the device to a low power consumption or sleep mode after a period of non-use. A wake-up from that sleep mode can be achieved, for example, by a physical button press and/or a touch screen swipe or other action. The user interface (UI) module can be, for example, based on touch screen technology and the various example screen shots shown in FIGS. 1a, 1d-c", 3a-c', and 4a-c', in conjunction with the grab and paste methodologies demonstrated in FIG. 5, which will be discussed in turn. The audio module can be configured, for example, to speak or otherwise aurally present a selected eBook table of contents or other textual content, if preferred by the user. Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher). Further note that although a touch screen display is provided, other embodiments may include a non-touch screen and a touch sensitive surface such as a track pad, or a touch sensitive housing configured with one or more acoustic sensors, etc.

Figure 2B:
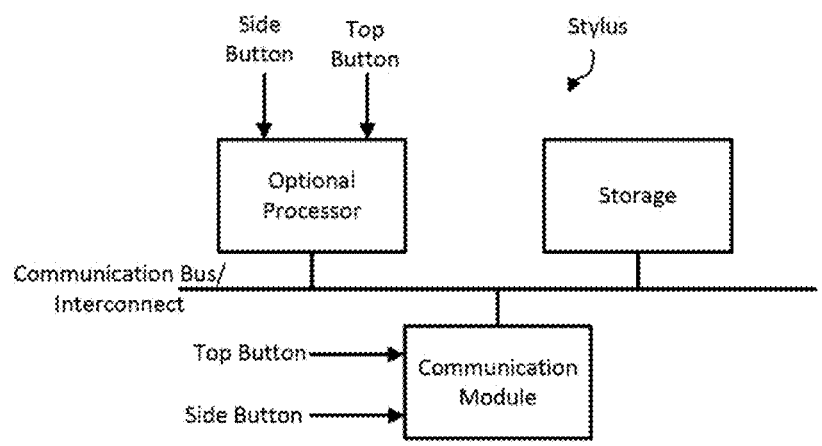
FIG. 2b illustrates a block diagram of a stylus configured in accordance with an embodiment of the present invention.

FIG. 2b illustrates a block diagram of a stylus configured in accordance with an embodiment of the present invention. As can be seen, this example stylus includes a storage/memory and a communications module. A communications bus and interconnect may be provided to allow inter-device communication. An optional processor may also be included in the stylus to provide local intelligence, but such is not necessary in embodiments where the electronic computing device with which the stylus is communicatively coupled provides the requisite control and direction. Other componentry and functionality not reflected in the block diagram will be apparent (e.g., battery, speaker, antenna, etc). The optional processor can be any suitable processor and may be programmed or otherwise configured to assist in controlling the stylus, and may receive input from the user from control features including a top and side button. The storage may be implemented with any suitable memory and size (e.g., 2 to 4 GBytes of flash memory).

The communications module can be, for instance, any suitable module which allows for connection to a nearby electronic device so that data can be downloaded to the stylus from the device, pasted from the stylus onto the device, or optionally deleted from the stylus. Example connection modules may include an NFC, radio-frequency identification (RFID), Bluetooth, Wi-Fi, electromagnetic, infrared or other light communication technologies, or any other communication technology. In this example case, the communications module can receive input from the user from control features including a top and side button, wherein such inputs can be used to enable the transmit function of the communications module. As will be appreciated, target content may be transferred between (e.g., copied or cut or pasted) the stylus and the electronic device over a communication link. In one embodiment, the stylus includes memory storage and a transceiver, but no dedicated processor. In such an embodiment, the processor of the electronic device communicates with the transceiver of the stylus and performs the copy, cut, paste, and delete actions as indicated by the user.

Conventional or custom discovery and handshake protocols can be used to introduce or otherwise relate a given stylus with a given device, in accordance with some embodiments. In some such cases, a software driver that comes with the stylus can be loaded onto the target electronic device, so as to enable the communication between the device and stylus as well as the functionality described herein. Such plug and play functionality can be implemented using any number of suitable self-discovery based communication protocols. Depending on the target price point of the stylus, such protocols may be heavy (e.g. Wi-Fi) or light (e.g., NFC or Bluetooth).

Figure 2C:
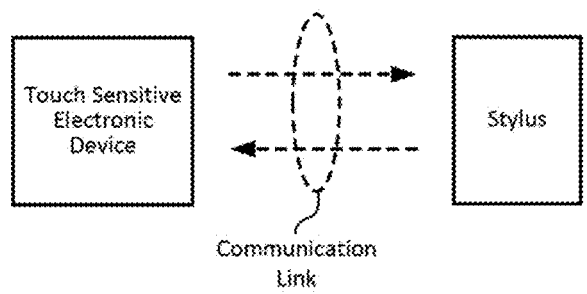
FIG. 2c illustrates a block diagram of a communication link between the touch sensitive electronic device of FIG. 2a and the stylus of FIG. 2b, configured in accordance with an embodiment of the present invention.

FIG. 2c illustrates a block diagram showing a communication link between the touch sensitive electronic device of FIG. 2a and the stylus of FIG. 2b, according to one embodiment of the present invention. As can be seen, the system generally includes an electronic touch sensitive device that is capable of wirelessly connecting to other devices and a stylus that is also capable of wirelessly connecting to other devices. In this example embodiment, the electronic touch sensitive device may be, for example, an e-Book reader, a mobile cell phone, a laptop, a tablet, desktop, or any other touch sensitive computing device. As described above, the communication link may include an NFC, Bluetooth, 802.11b/g/n WLAN, or other suitable communication link which allows for transfer of data between one or more electronic devices and a stylus.

Example Grab and Paste Functions

Figure 3A:
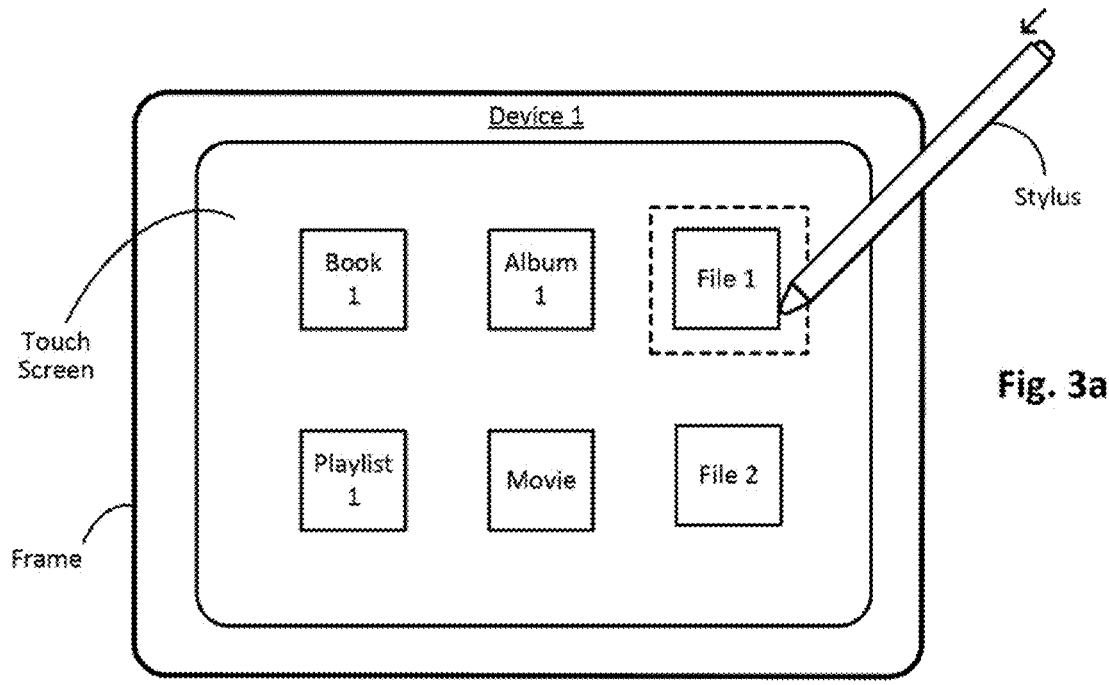
FIGS. 3a-b illustrate an example cut function of an electronic touch sensitive device and stylus, in accordance with an embodiment of the present invention.

FIG. 3a illustrates an example cut function of an electronic touch sensitive device and stylus, in accordance with an embodiment of the present invention. As can be seen, a physical frame or support structure is provided about the screen of Device 1, and the screen is displaying a book, playlist, album, movie, and two files. In this particular example scenario, the top button of the stylus is associated with the cut function (e.g., hard-coded or via a configuration sub-menu) and the user has selected File 1. File 1 may be selected in any suitable manner using the stylus, the user's finger, or any other selection method (note that selection of the File 1 may have been pre-established prior to the cut action, or at the same time as the cut action). In this example case, the highlight selection mode, described in reference to FIG. 1e, has been enabled and the user has contacted the stylus with the touch screen (direct or proximate contact may be sufficient, depending on the touch screen technology) and pressed the top button of the stylus, thus highlighting File 1. Such optional highlighting may assist the user in identifying what data will be copied or cut before performing the action.

Figure 3B:
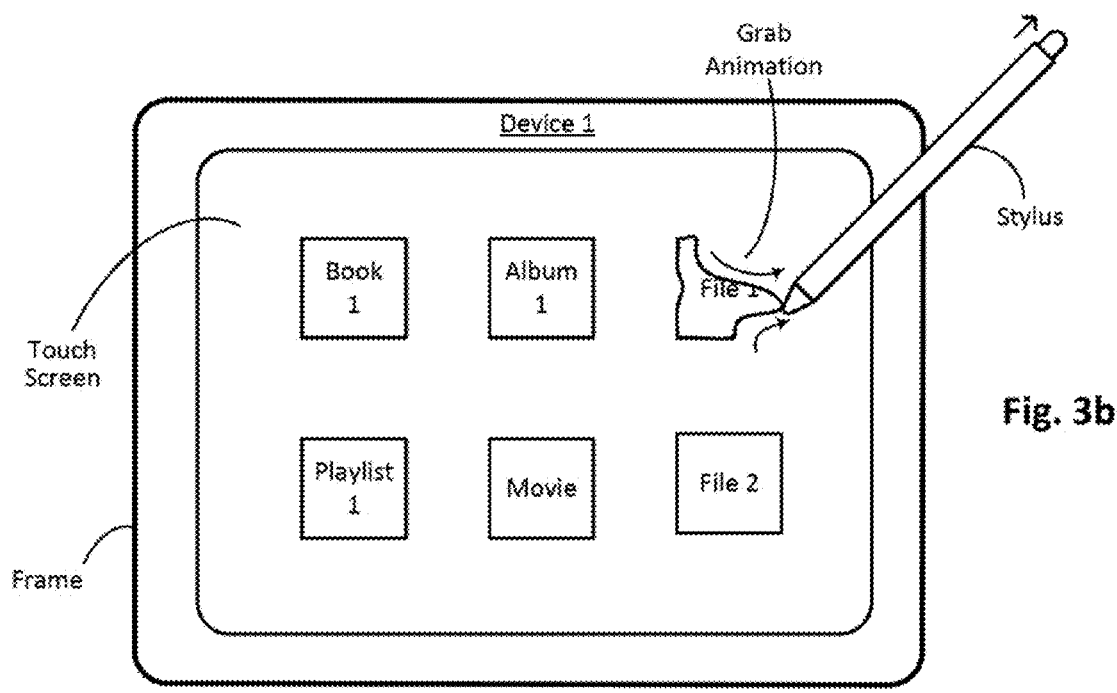

In the example shown in FIG. 3b, when the user releases the top button of the stylus, File 1 is cut from Device 1 and saved to the memory within the stylus. Note the grabbing process is visually demonstrated to the user as it is carried out via grab animation in this example case. Such animation provides clarity to the action being taken. In this particular example, the cut function is performed upon release of the button and the stylus must remain in contact with (or sufficiently proximate to) the touch screen surface until the button is released. In some such example scenarios, if the user decides not to cut File 1 after pressing the button (as shown in FIG. 3a), the user may remove the stylus from contact with the touch screen before releasing the button, and the file will not be cut and saved to the stylus (it will be left in its current location on Device 1). In another example case, the cutting function can be performed as soon as the stylus button is pressed, and as long as the communication link can be maintained, the cut action will be carried out and the target content will be transferred to the stylus memory. In other embodiments, upon release of the stylus button, an action may be automatically performed on File 1. For instance, File 1 may be sent to trash, sent to a designated folder, or deleted, in some such embodiments. As previously explained, the resulting action may be user-configurable or hard-coded.

Figure 3C:
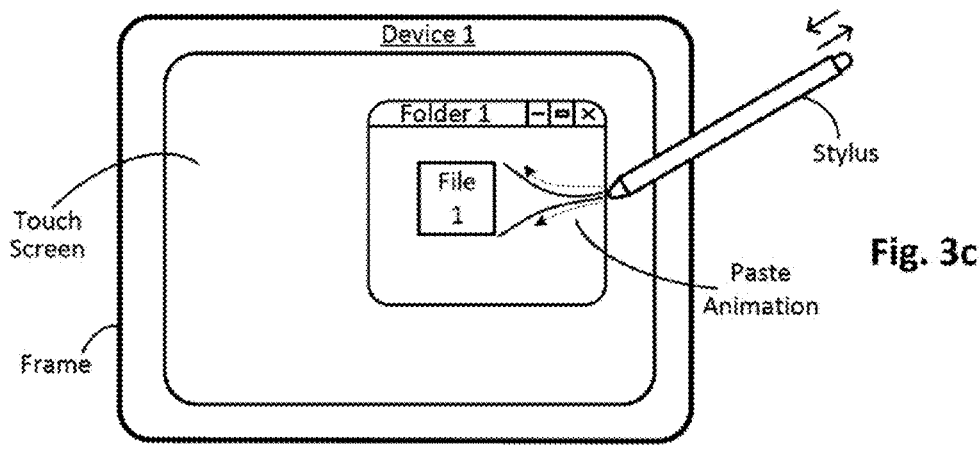
FIG. 3c illustrates an example paste function of a stylus and an electronic touch sensitive device, in accordance with an embodiment of the present invention.
Figure 3C:
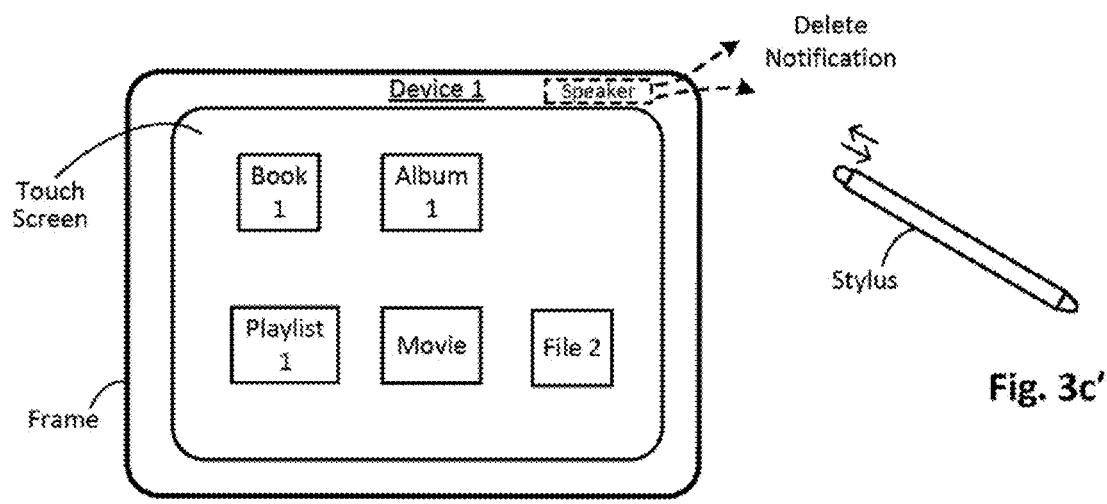
Figure 3C:
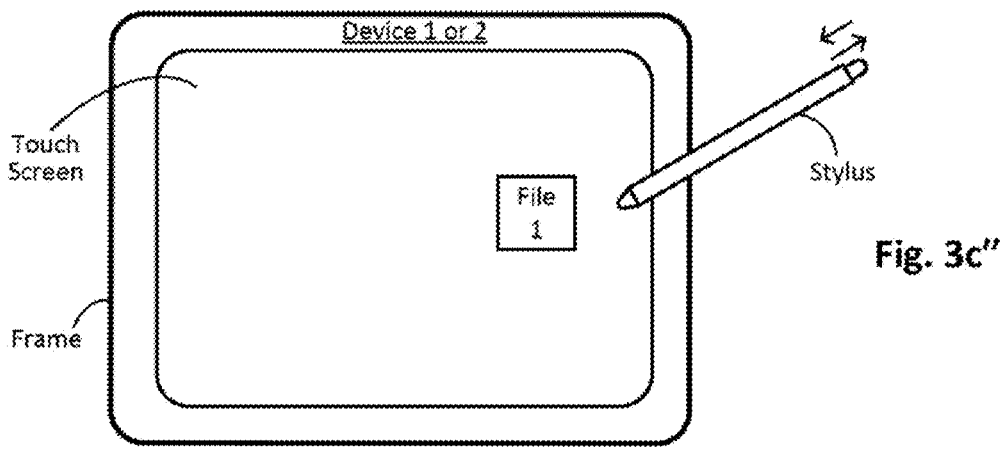

In the example shown in FIG. 3c, the user has saved File 1 to the stylus and has further accessed Folder 1 within Device 1. In this particular example, the folder is selected (based on proximity to stylus at time of paste action, or cursor location at time of paste action, or actual selection of the folder prior to paste action) and the user clicks the top button of the stylus with the stylus oriented toward Device 1, thus pasting File 1 into Folder 1. Note that the stylus may or may not be in actual contact with the touch screen and the pasting function may still be successfully performed.

In an alternative example scenario, shown in FIG. 3c', File 1 is deleted from the stylus by performing the click action on the top button with the stylus oriented away from Device 1. Note the aural notification of the deletion in this example embodiment, which may be the sound of crumpling paper hitting a waste basket or an appropriate message recorded by the user. Any number of intuitive, whimsical, or arbitrary sound effects can be used for the delete function, or for any other functions provided herein. In yet another example, shown in FIG. 3c". File 1 is pasted to another location on Device 1 or onto another compatible device, Device 2, by performing the click action on the top button with the stylus oriented toward the target device. Device 2 could be any electronic device that can wirelessly communicate with the stylus. A wired connection may be used as well.

Figure 4A:
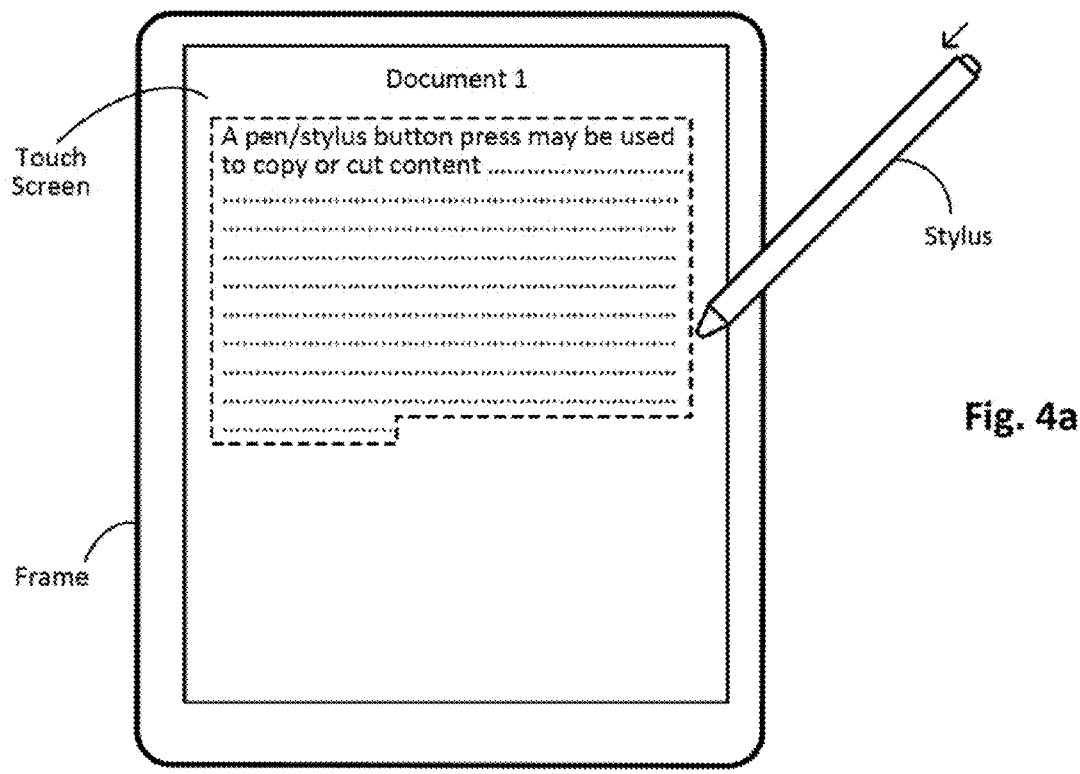
FIGS. 4a-c' illustrate an example copy function of an electronic touch sensitive device and stylus, in accordance with an embodiment of the present invention.
Figure 4B:
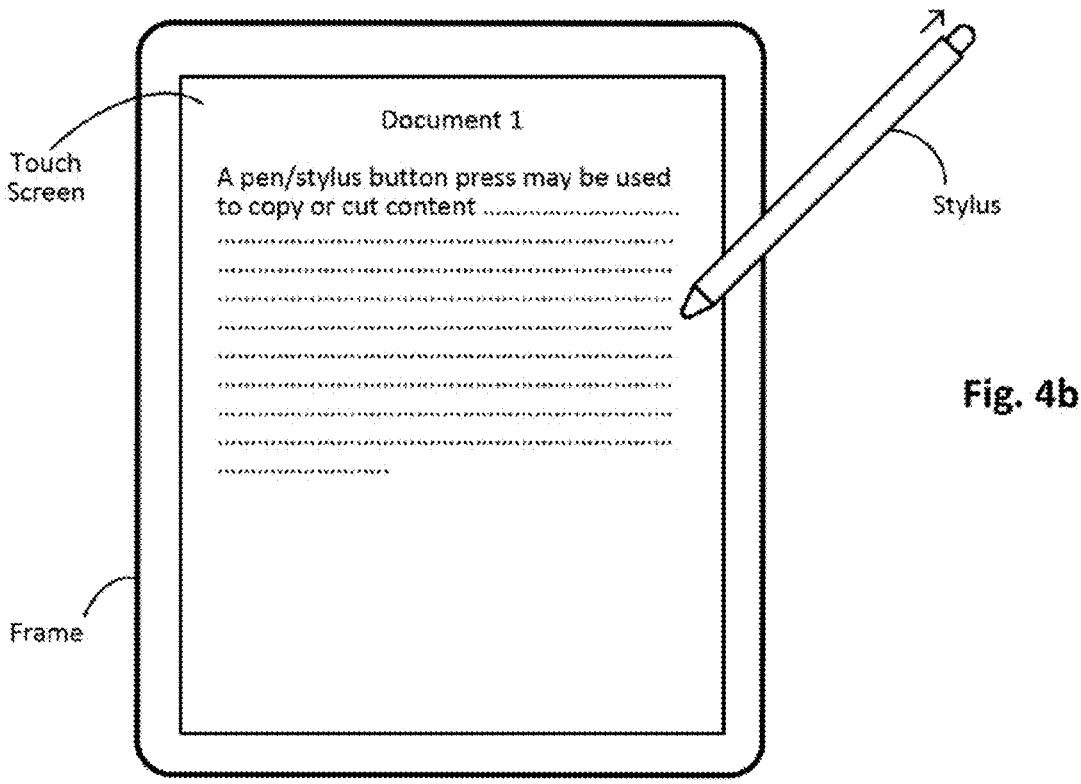
Figure 4C:
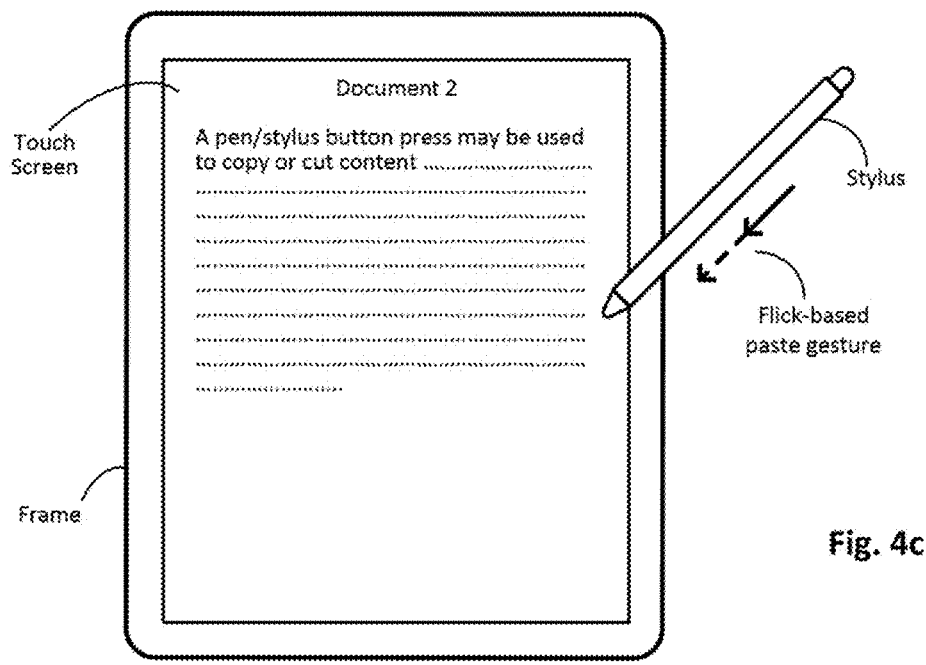
Figure 4C:
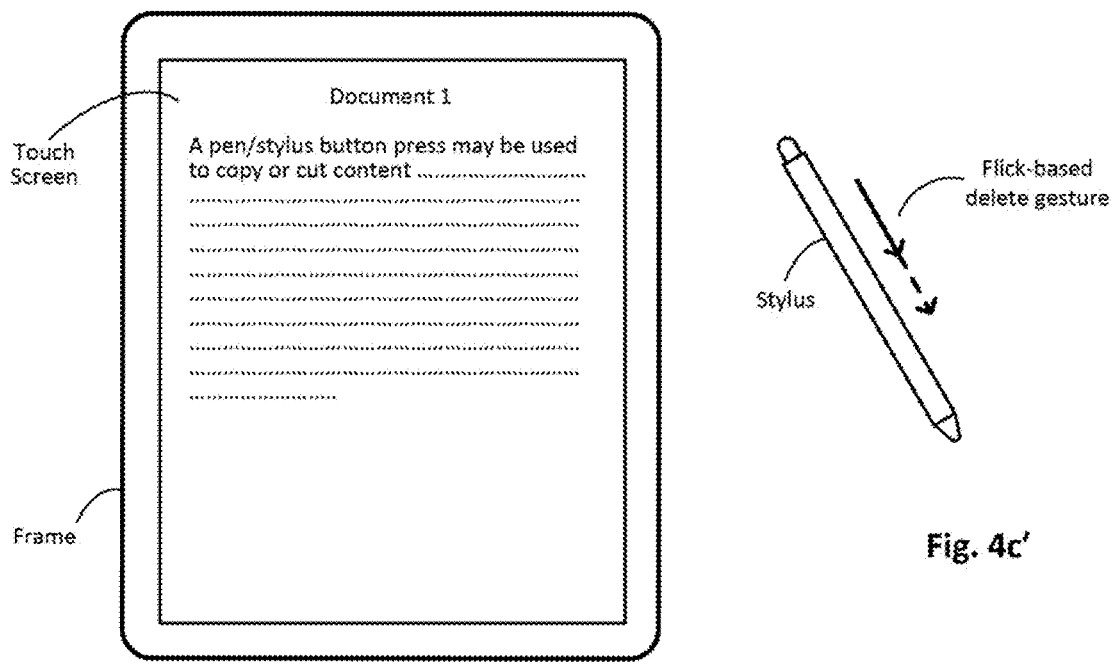

FIGS. 4a-c' illustrate an example copy function of an electronic touch sensitive device and stylus, in accordance with an embodiment of the present invention. As seen in this example, the screen is displaying a document, Document 1, including a block of content. The block of content in this example is depicted as a paragraph of text, but it could be any block of content, such as a chapter or chapter section of text or rich media, or an entire book (e.g., text book for a given class or subject), or some specific selection of text or rich media, or a video clip, or an audio clip.

In this particular example, assume that the top button of the stylus is associated with the copy function (e.g. hard-coded or via a configuration sub-menu) and the user has selected text of Document 1. The text of Document 1 may be selected in any suitable manner using the stylus, the user's finger, or any other selection method. Continuing with this specific example, further assume that the highlight selection mode, described in reference to FIG. 1e, has been enabled and the user has made sufficient stylus contact with the touch screen and pressed the top button, thus highlighting the text of Document 1. In this example case, highlighting is depicted with a dashed boarder, but any number of visual indicators can be used to identify pre-selected content or content effectively selected in real-time during a selection-free grab action. Alternatively, in other embodiments the text could be selected automatically with no visual indication of any particular selection, in response to a stylus-based selection-free grab action as previously described.

In the example shown in FIG. 4b, when the user releases the top button of the stylus, the text of Document 1 is copied from the device and saved to the memory within the stylus. In this particular example, the copy function is performed upon release of the button and the stylus remains in contact with Document 1 until the button is released. In such an example, if the user decides not to copy the text of Document 1 after pressing the button (as shown in FIG. 4a), the user may remove the stylus from contact with the touch screen before releasing the button, and the file copy will effectively be canceled. In other embodiments, the copy function can commence immediately upon pressing of the stylus button and the stylus need only remain communicatively coupled with the device. As previously explained, the various stylus actions may be user-configurable or hard-coded.

In the example shown in FIG. 4c, the user has accessed a new document, Document 2, within the electronic device and performs the flick gesture oriented toward the device. In one embodiment, the flick gesture includes accelerating the stylus tip toward the surface of the electronic device. In such an example, the UI executing within the electronic device can sense the proximity or distance of the stylus from the surface of the device, and thus an accelerated motion toward the device may be registered as a flick gesture and may be assigned a function. In some embodiments, the stylus does not need to actually make physical contact with the surface of the electronic device for a flick gesture to be detected. In this particular example, the flick paste function is enabled, and therefore the content from Document 1 that is saved on the stylus may be pasted to Document 2.

In the example shown in FIG. 4c', the user has decided to delete the text of Document 1 from the stylus memory, and therefore performs the flick gesture oriented away from the electronic device. In this particular example, the flick gesture oriented away from the device clears the stylus memory. In some embodiments, a given paste action may remove the content from the memory of the stylus, while in other embodiments a copy of the content may remain on the stylus after the paste function is complete.

Methodology

FIG. 5 illustrates a method for copying/cutting content from an electronic touch screen device onto a stylus, and pasting/deleting the content from the stylus, in accordance with an embodiment of the present invention. This example methodology may be implemented, for instance, by the UI module of the touch sensitive device shown in FIG. 2a. To this end, the UI module can be implemented in software, hardware, firmware, or any combination thereof, as will be appreciated in light of this disclosure. The content may be copied or cut and saved to the stylus memory over a communication link as directed by an optional processor within the stylus and/or by the processor of the electronic device. Likewise, the content may be pasted or deleted over a communication link as directed by the stylus optional processor and/or by the processor of the electronic device. In one particular example, the stylus may include only memory and a transceiver and the processor of the electronic device performs all the various grabbing and pasting functions. In one such example, clicking the button on the stylus prompts the device processor to send target content to the stylus memory and optionally delete content from the device. Subsequently clicking the stylus button or flicking the stylus prompts the device processor to paste or delete content from the stylus memory. The device processor can be further programmed or otherwise configured to calculate the distance from the stylus to the screen (based on stylus detection signals generated by the touch screen or otherwise deployed stylus detection circuitry in the device) in order to detect a flick gesture.

In general, any touch sensitive device may be used to detect contact with it by the stylus. As soon as the user begins to drag or otherwise move the stylus tip, the UI code (and/or hardware) can assume a drag gesture has been engaged and track the path of the stylus tip with respect to any fixed point within the touch surface until the user stops engaging the touch sensitive surface. The release point can also be captured by the UI as it may be used to commit the action started when the stylus initially contacted the touch sensitive surface. In a similar fashion, if the user releases the stylus contact without moving the stylus tip, a press or press-and-hold command may be assumed depending on the amount of time the user was continually pressing on the touch sensitive surface. These main detections can be used in various ways to implement UI functionality.

In this example case, the method includes determining 501 whether content on the electronic device is currently selected. The content selection may be performed by one or more gestures of the stylus, fingers, or any other implement. Alternatively, the selection can be effectively pre-established if selection-free grab is enabled. In general, the selection monitoring is effectively continuous. If content is selected (either affirmatively by the user or presumptively by the computing device), the method may continue with detecting 502 a stylus contact at the touch sensitive interface. Once a stylus contact is detected at the touch sensitive interface, the method may continue with determining 503 if a grab action is detected. The grab action may be pre-established in a configuration sub-menu or hard-coded as previously explained. The stylus action may include the manipulation of one or more control features of the stylus, such as clicking the top button and/or the side button, or any uniquely identifiable stylus action or stylus contact on a touch sensitive surface. If no grab action is detected, the stylus contact may be reviewed 504 for other UI requests.

If, however, a stylus grab action is detected, the method may continue with determining 505 whether the stylus action is associated with the copy function. The stylus action may be associated with the copy function in a configuration sub-menu, or it may be hard coded as previously explained. If the stylus action is associated with the copy function, then the method may continue with copying 506 the selected content and saving it to memory within the stylus. If, however, the stylus action is not associated 505 with the copy function, the method may include determining 509 whether the stylus action is associated with the cut function. The stylus action may be associated with the cut function in a configuration sub-menu, or it may be hard coded as previously explained. If the stylus action is not associated with the cut function, the stylus contact may be reviewed 504 for some other UI request. If the stylus action is associated with the cut function, the method may continue with cutting 510 the content from the electronic device and copying it to the memory within the stylus.

Once the content has been copied 506 or cut 510 to the stylus, the method may further continue with determining 507 whether a stylus control feature action is detected. The stylus control feature action may include pressing one or more buttons on the stylus, flipping a switch, compressing a sensor, moving a slide bar, rotating a knob, or any other stylus control action. If a control feature action is detected at 507, the method may continue with determining 508 whether the control feature paste function is enabled. If not, then the stylus contact may be reviewed 504 for other UI requests. If, however, a control feature action is not detected at 507, the method may continue with determining 511 if a stylus flick is detected. If no stylus flick is detected, then the stylus contact may be reviewed 504 for some other UI request. If a stylus flick is detected, the method may continue with determining 512 if the flick paste function is enabled. In one particular example, either or both of the control feature paste function and the flick paste function may be enabled with one or more check boxes in a configuration sub-menu, as described in reference to FIG. 1e. In other embodiments these functions may be hard-coded. If the flick paste function is not enabled, the stylus contact may be reviewed 504 for another UI request.

If the control feature paste function is enabled (at 508) or the flick paste function is enabled (at 512), the method may continue with determining 513 whether the stylus is oriented toward an electronic device. The stylus may be oriented toward any electronic device that is capable of receiving data from the stylus through a wireless or wired connection. If the stylus is oriented toward an electronic device, the method may continue with pasting 514 the content to the device. In some embodiments, the paste action may remove the content from the memory of the stylus, while in other embodiments a copy of the content may remain on the stylus after the paste function is complete. If the stylus is not oriented toward an electronic device, the method may continue with deleting 515 the content from the stylus memory.

Numerous embodiments will be apparent, and features described herein can be combined in any number of configurations. One example embodiment of the present invention provides a system which includes an electronic device having a display for displaying content to a user and a touch sensitive surface for allowing user input. The system also includes a user interface executable on the device and including a grab mode that can be activated in response to a stylus action, wherein the grab mode is configured to save selected content from the device to a stylus memory, and to at least one of delete the selected content from the stylus memory and/or save the selected content from the stylus memory to an electronic device. In some cases, the display is a touch screen display that includes the touch sensitive surface which is further capable of detecting stylus-based input. In some cases, saving content from the device to the stylus memory further includes removing the selected content from the device. In some cases, the system further includes a stylus and stylus memory, wherein the stylus is configured to communicate with the electronic device via either direct or proximate contact with the touch sensitive surface. In some such cases, the stylus includes at least one of a button, a rotating knob, a switch, and/or a sliding switch. In some cases, the touch sensitive surface is configured to detect the stylus action, and the stylus action includes at least one of manipulating one or more stylus control features and/or a stylus flick gesture that includes the stylus accelerating directly at the touch sensitive surface. In some cases, the touch sensitive surface detects a stylus gesture by detecting a change in resonant frequency of the stylus and/or tracking the location of a resonant circuit within the stylus. In some cases, in response to accelerating the stylus toward an electronic device, the grab mode is further configured to paste the selected content to the electronic device. In some cases, in response to accelerating the stylus away from an electronic device the grab mode is further is configured to delete the selected content from the stylus memory. In some cases, the stylus action is user-configurable. In some cases, the touch sensitive surface comprises at least one set of antenna coils configured to detect changes in a resonant circuit within the stylus. In some such cases, the touch sensitive surface further includes a second set of antenna coils configured to detect at least one of location, speed of stylus movement, angle of stylus inclination and/or a change in resonant frequency of the resonant circuit within the stylus. In some cases, the stylus action includes a content selection followed by at least one stylus control feature action.

Another embodiment of the present invention provides a system including an electronic device having a processor and a touch screen display for displaying content to a user and allowing user input. The system also includes a stylus having a memory and at least one control feature, wherein the stylus is configured to communicate with the electronic device via the touch screen display. The system also includes a user interface executable on the device including a grab mode that can be activated in response to a stylus action, wherein the grab mode is configured to cause selected content to be sent to the stylus memory, and wherein an animation is displayed as content is sent to the stylus, the animation showing content being sucked into the stylus. In some cases, the device is configured to communicate with the stylus over a wireless communication link. In some cases, the device is an eReader device or a tablet computer or a smartphone. In some cases, the stylus action includes: a stylus flick gesture that includes the stylus accelerating toward the touch screen display; or manipulating at least one of a button, a rotating knob, a switch, and/or a sliding control bar included on the stylus.

Another example embodiment of the present invention provides a computer program product including a plurality of instructions non-transiently encoded thereon to facilitate operation of an electronic device according to a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to save (in response to a stylus action) selected content from an electronic device to memory on the stylus; and (in response to a subsequent stylus action) at least one of delete the selected content from the memory on the stylus and/or save the selected content from the memory of the stylus to an electronic device. In some cases, saving selected content from an electronic device to memory on the stylus includes at least one of copying content from the electronic device, and/or cutting content from the electronic device. In some cases, the stylus action includes performing a stylus flick gesture or manipulating at least one of a button, a rotating knob, a switch, and/or a sliding control bar included on the stylus.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system, comprising:
an electronic device having a display for displaying content to a user and a touch sensitive surface for allowing user input; and
a user interface executable on the device and comprising a grab mode that can be activated in response to a stylus action, wherein the grab mode is configured to save selected content from the device to a stylus memory, and to at least one of delete the selected content from the stylus memory and/or save the selected content from the stylus memory to a memory external to the stylus;
wherein in response to accelerating the stylus away from the device, the grab mode is further is configured to delete the selected content from the stylus memory.

2. The system of claim 1 wherein the display is a touch screen display that includes the touch sensitive surface which is further capable of detecting stylus-based input.

3. The system of claim 1 wherein saving content from the device to the stylus memory further includes removing the selected content from the device.

4. The system of claim 1 further comprising the stylus and stylus memory, wherein the stylus is configured to communicate with the electronic device via either direct or proximate contact with the touch sensitive surface.

5. The system of claim 4 wherein the stylus includes at least one of a button, a rotating knob, a switch, and/or a sliding switch.

6. The system of claim 1 wherein the touch sensitive surface is configured to detect the stylus action, and the stylus action includes at least one of manipulating one or more stylus control features and/or a stylus flick gesture that includes the stylus accelerating directly at the touch sensitive surface.

7. The system of claim 1 wherein the touch sensitive surface detects a stylus gesture by detecting a change in resonant frequency of the stylus and/or tracking the location of a resonant circuit within the stylus.

8. The system of claim 1 wherein in response to accelerating the stylus toward the device, the grab mode is further configured to paste the selected content to the device.

9. The system of claim 1 wherein the stylus action is user-configurable.

10. The system of claim 1 wherein the touch sensitive surface comprises at least one set of antenna coils configured to detect changes in a resonant circuit within the stylus.

11. The system of claim 10 wherein the touch sensitive surface further comprises a second set of antenna coils configured to detect at least one of location, speed of stylus movement, angle of stylus inclination and/or a change in resonant frequency of the resonant circuit within the stylus.

12. The system of claim 1 wherein the stylus action includes a content selection followed by at least one stylus control feature action.

13. A system, comprising:
an electronic device having a processor and a touch screen display for displaying content to a user and allowing user input; and
a user interface executable on the device comprising a grab mode that can be activated in response to a stylus action, wherein the grab mode is configured to cause selected content to be sent to a stylus memory;
wherein an animation is displayed on the touch screen display as content is sent to the stylus, the animation simulating content being sucked from the display to the stylus.

14. The system of claim 13 further comprising a stylus for providing the stylus action and including the stylus memory and at least one control feature, wherein the stylus is configured to communicate with the electronic device via the touch screen display to provide a first communication path, and wherein the device is configured to communicate with the stylus over a wireless communication link to provide a second communication path.

15. The system of claim 13 wherein the device is an eReader device or a tablet computer or a smartphone.

16. The system of claim 13 wherein the stylus action includes: a stylus flick gesture that includes the stylus accelerating toward the touch screen display; or manipulating at least one of a button, a rotating knob, a switch, and/or a sliding control bar included on the stylus.

17. A non-transitory computer program product comprising a plurality of instructions encoded thereon that when executed by one or more processors cause a process to be carried out, the process comprising:
in response to a stylus action, save selected content from an electronic computing device to memory on the stylus; and
in response to a subsequent stylus action, at least one of delete the selected content from the memory on the stylus and/or save the selected content from the memory of the stylus to a memory external to the stylus;
wherein in response to accelerating the stylus away from the device, the grab mode is further is configured to delete the selected content from the stylus memory.

18. The computer program product of claim 17 wherein saving selected content from the electronic device to the memory on the stylus includes at least one of copying content from the electronic device, and/or cutting content from the electronic device.

19. The computer program product of claim 17 wherein the stylus action includes performing a stylus flick gesture or manipulating at least one of a button, a rotating knob, a switch, and/or a sliding control bar included on the stylus.

20. A non-transitory computer program product comprising a plurality of instructions encoded thereon that when executed by one or more processors cause a process to be carried out for saving content from an electronic computing device to a stylus, the process comprising:
in response to a stylus action, save selected content from the electronic computing device to memory on the stylus; and
display an animation on a display of the electronic computing device as content is sent to the stylus, the animation simulating content being sucked from the display to the stylus.

21. The program product of claim 20, the process further comprising:
in response to a further stylus action, paste selected content from the stylus memory to a memory of the electronic computing device; and
display an animation on a display of the electronic computing device as content is sent to the electronic computing device memory, the animation simulating content being ejected from the stylus to the display.

22. The program product of claim 20, the process further comprising:
in response to a further stylus action, purge selected content from the stylus memory; and
present a sound from a speaker of the electronic computing device as content is purged.

* * * * *